US00RE33795E

United States Patent [19]

Ogino

[11] E

[45] Reissued

Patent Number: Re. 33,795

Date of Patent: Jan. 14, 1992

[54] REAR PROJECTION APPARATUS

[75] Inventor: Masanori Ogino, Yokohama, Japan

[73] Assignee: Hitachi, Ltd., Tokyo, Japan

[21] Appl. No.: 481,104

[22] Filed: Feb. 16, 1990

Related U.S. Patent Documents

Reissue of:

[64] Patent No.: 4,725,134
Issued: Feb. 16, 1988
Appl. No.: 33,000
Filed: Mar. 30, 1987

U.S. Applications:

[63] Continuation of Ser. No. 742,795, Jun. 10, 1985, abandoned.

[30] Foreign Application Priority Data

Jun. 13, 1984 [JP] Japan ..... 59-119997

[51] Int. Cl.[5] ..... G03B 21/60

[52] U.S. Cl. ..... 353/74; 359/457

[58] Field of Search ..... 353/74, 38, 10; 350/123, 126, 127, 128; 358/60, 231, 239

[56] References Cited

U.S. PATENT DOCUMENTS

| | | | |
|---|---|---|---|
| 2,525,596 | 11/1950 | Finn | 350/123 |
| 3,893,748 | 7/1975 | De Palma et al. | 350/128 |
| 4,054,907 | 10/1977 | Itoh et al. | 350/128 |
| 4,432,010 | 2/1984 | Oguino | 358/60 |
| 4,512,631 | 4/1985 | Van Breemen | 350/128 |
| 4,531,812 | 7/1985 | Oguino | 350/128 |

FOREIGN PATENT DOCUMENTS

| | | | |
|---|---|---|---|
| 0052985 | 5/1981 | Japan | 358/60 |
| 0072935 | 5/1983 | Japan | 358/60 |
| 0158627 | 9/1983 | Japan | 358/60 |

*Primary Examiner*—William A. Cuchlinski, Jr.
*Assistant Examiner*—William Dowling
*Attorney, Agent, or Firm*—Antonelli, Terry, Stout & Kraus

[57] ABSTRACT

The present invention consists in a rear image projection apparatus having a transmissive screen of high efficiency and low moiré disturbance. In particular, the screen comprises a Fresnel sheet having a Fresnel lens, a front sheet having a horizontally-diffusing lenticular lens and a light diffusing element, and if necessary, a third sheet, wherein at least one surface of the Fresnel sheet or the third sheet is formed with a vertically-diffusing lenticular lens, and a pitch of the Fresnel lens is set to be at most 150% of an effective diffusion width of the diffusion element.

20 Claims, 4 Drawing Sheets

REAR PROJECTION APPARATUS

Matter enclosed in heavy brackets [ ] appears in the original patent but forms no part of this reissue specification; matter printed in italics indicates the additions made by reissue.

[This application is a continuation of application Ser. No. 742,795, filed June 10, 1985 and now abandoned.] *This application is a reissue of application Ser. No. 07/033,000, filed Mar. 30, 1987 and now U.S. Pat. No. 4,725,134, which is a continuation of application Ser. No. 06/742,795, filed June 10, 1985 and now abandoned.*

BACKGROUND OF THE INVENTION

The present invention relates to a rear projection apparatus, and more particularly to a transmissive screen of high efficiency and low moiré disturbance.

The configuration of a rear projection apparatus is shown in FIG. 1 (a plan view or a side view). In the figure, numeral 1 designates a screen, numeral 2 a projection lens, and numeral 3 a projection cathode-ray tube.

A prior-art example of the screen is shown in FIG. 2 (a perspective view). In the figure, numeral 2 designates the projection lens. Numerals 4 and 5 designate screen elements, which are respectively termed the "Fresnel sheet" and "front sheet". A concentrical Fresnel lens 20 is formed on the output side of the Fresnel sheet 4, and it transforms diverging input light into output light which is substantially normal to the plane of the screen. A horizontal lenticular lens 19 for horizontally diffusing light microscopically is formed on the input side of the front sheet 5. This front sheet is formed of a methacrylic resin, in which a diffusion material for diffusing light at random is mixed.

The performance of the screen of this prior art is featured by a gain G as viewed from the front side, the half gain angle $\alpha_H$ of horizontal directivity, and the half gain angle $\alpha_V$ of vertical directivity.

FIG. 3 is a perspective view for expressing the significances of $\alpha_H$ and $\alpha_V$. In the figure, numeral 6 denotes the range of effective directivity.

The typical values of the screen attained by the prior art were G+5, $\alpha_H=40°$ and $\alpha_V=6°$. Accordingly, the $G\cdot\alpha_H\cdot\alpha_V$ product (the gain-half gain angle product) is calculated as 1200.

Meanwhile, the theoretical limit of a light transmission efficiency was analyzed as will be stated later. As a result, it has been found that the above value 1200 is an unsatisfactory level which is below 50% as compared with the theoretical limit. Besides, as the result of experimental study, it has been revealed that the deterioration is principally attributed to the diffusion material contained in the resin of the front sheet.

With the prior art, when the diffusion material is diminished, the vertical half gain angle $\alpha_V$ becomes too small, and moiré disturbance arises. It has therefore been considered impracticable to attain enhancement in the gain by diminishing the diffusion material more.

The moiré disturbance herein referred to is intended to mean an interference pattern as indicated at numeral 7 in FIG. 4 (a front view of the screen), which is generated by the interference between the concentrical pattern of the Fresnel lens and the vertical stripe pattern of the horizontal lenticular lens.

As regards a technique for reducing the moiré disturbance of the projection screen, Japanese Patent Application Laid-open No. 191627/1982 entitled "Rear Projection Type Screen" states to the effect that setting the ratio between the pitch of the horizontal lenticular lens and the pitch of the Fresnel lens in a range of 1.35–1.43 is the best for the reduction of the moiré disturbance. It has been difficult, however, to reduce the moiré disturbance much more within or in the vicinity of this range. The principle of the appearance of the disturbance is, per se, unclear, and there has not been any example analyzed quantitatively.

SUMMARY OF THE INVENTION

An object of the present invention is to provide a rear projection apparatus whose gain-half gain angle product is great and which can project an image with its moiré disturbance relieved within allowable limits.

In order to accomplish the object, the inventor conducted:

(1) theoretical elucidation of the gain-half gain angle product, and (2) quantitative elucidation of the moiré disturbance. The present invention has been made on the basis of the results, and it has the characterizing feature of improving the gain-half gain angle product as much as at least 1.5 times that of the prior-art screen shown in FIG. 2, by diminishing the amount of the diffusion material in the front sheet and applying novel constructional items listed below.

(i) A vertical lenticular lens for vertically diffusing light is disposed anew.

(ii) The pitch of the Fresnel lens is set at or below 150% of the equivalent width which correspond to the half gain angle (which corresponds to an effective diffusing width to be described later) of a diffusion element for reducing the moiré disturbance.

DESCRIPTION OF THE PREFERRED EMBODIMENTS

Before describing the embodiments of the present invention, items concerning the present invention studied by the inventor will be explained in detail.

Figure 3:
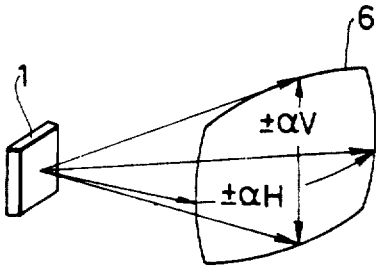
PRIOR ART FIG. 3
FIG. 3 is a perspective view showing the concept of the directivities of the screen.
Figure 4:
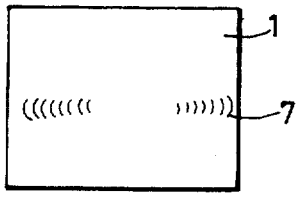
PRIOR ART FIG. 4
FIG. 4 is a front view showing moiré disturbance.

First, the theoretical limit of the gain-half gain angle product shall be evaluated. In FIG. 3, a horizontal plane containing the normal direction of the screen 1 is set as the equatorial plane of polar coordinates, above which the North Pole is set, and the longitudinal coordinate is denoted by $\phi$ while the latitudinal coordinate by $\theta$.

Assuming that a light flux entering the unit cross-sectional area of the screen by 1 lumen, the corresponding exit light must also be 1 lumen if no reflection or absorption loss is involved in the screen.

Letting B nt denote the brightness of the screen exit light in a direction ($\phi$, $\theta$), the total exit light flux Lo is calculated by the following equation:

$$Lo = \int\int B \cos\theta \cos\phi d\Omega \quad 1$$

In the above equation, $d\Omega$ denotes a solid angle element, which is expressed as:

$$d\Omega = \cos\theta d\theta d\phi \quad 2$$

Substituting Eq. 2 into Eq. 1, $$Lo = \int\int B \cos^2\theta \cos\phi d\theta d\phi \quad 3$$

Now, as directivities, uniform distributions are assumed as follows:

$$B = \text{constant for} \begin{cases} |\theta| \leqq \alpha_V \times \frac{\pi}{180^\circ} \\ |\phi| \leqq \alpha_H \times \frac{\pi}{180^\circ} \end{cases}$$

$$B = 0 \text{ for} \begin{cases} |\theta| > \alpha_V \times \frac{\pi}{180^\circ} \\ |\phi| > \alpha_H \times \frac{\pi}{180^\circ} \end{cases}$$

When Eq. 3 is calculated by substituting the above equation, the following equation is obtained:

$$Lo = B\left\{\alpha_V \times \frac{2\pi}{180^\circ} + \sin 2\alpha_V\right\}\sin\alpha_H \quad 4$$

When $\alpha_V = 90^\circ$ and $\alpha_H = 90^\circ$ are substituted into the above equation by supposing an Ideal Lambertian surface, $Lo = B\pi$ is obtained. That is, in the case of Ideal Lambertian surface of no loss, B becomes $Lo/\pi$. In this case, the screen gain is defined "1". When the gain is defined with reference to this case and the gain value Go in the case of no loss is found from Eq. 4, the following equation is obtained:

$$Go = \frac{B}{Lo/\pi} = \frac{\pi}{\left(\alpha_V \times \frac{2\pi}{180^\circ} + \sin 2\alpha_V\right)\sin\alpha_H} \quad 5$$

When $\alpha H = 40^\circ$ and $\alpha_V = 6^\circ$ already mentioned as the typical examples of the prior art are substituted into Eq. 5, the no-loss gain Go is calculated as 11.7 times. Accordingly, the ideal gain-half gain angle product is calculated as about 2810. It is therefore understood that the already-mentioned value of 1200 in the prior art is limited to approximately −7.4 dB of the ideal value.

When it is considered that the loss of one surface of the input and output surfaces of each of the two sheets constituting the screen is approximately 0.35 dB, the loss of the screen totaling four surfaces becomes 1.4 dB. It has been clarified by the above analysis that, even when this loss is removed, a great loss of approximately 6 dB is involved. The major cause of the great loss residues in the light diffusing element which is mixed in the front sheet.

Figure 1:
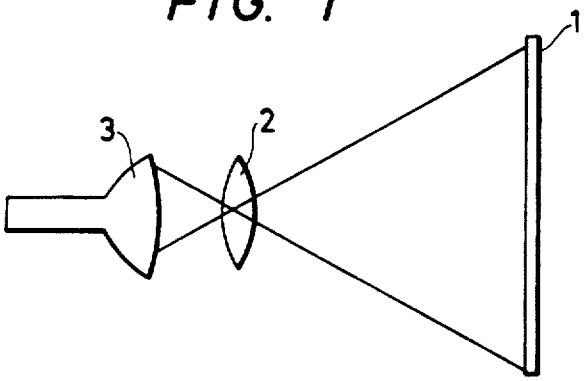
PRIOR ART FIG. 1
FIG. 1 is a plan view or side view showing the fundamental configuration of an image projection apparatus.
Figure 2:
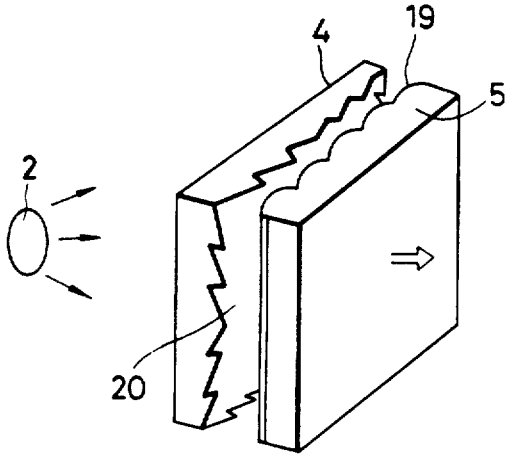
PRIOR ART FIG. 2
FIG. 2 is a perspective view of a screen in a prior art.
Figure 5:
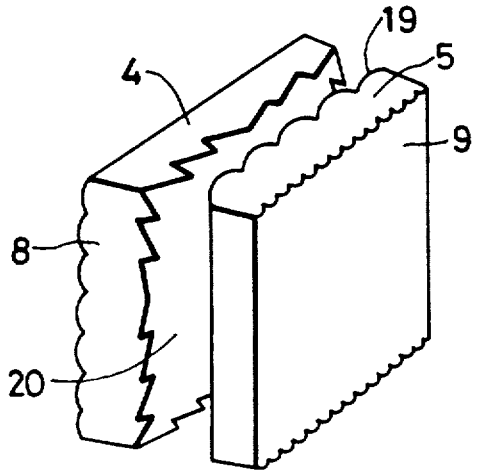
FIG. 5 is a perspective view of the fundamental embodiment of the present invention.

The fundamental embodiment of the present invention is shown in FIG. 5 (a perspective view). The figure illustrates the detailed configuration of the screen 1 in FIG. 1, in which numeral 4 designates the Fresnel sheet and numeral 5 the front sheet. The concentrical Fresnel lens 20 is formed on the output side of the Fresnel sheet 4, while a vertical lenticular lens 8 for vertically diffusing light is provided anew on the input side. The main horizontal lenticular lens 19 is formed on the input side of the front sheet 5, while a horizontally diffusing microscopic lenticular lens 9 of minute pitch is provided anew on the output side.

Owing to the action of the vertical lenticular lens 8 in the above configuration, the light diffusing material in the front sheet, which has been required for spreading the vertical directivity in the prior art, is diminished to or below half, and the efficiency can be improved by at least 3 dB (at least 1.4 times in terms of the gain-half gain angle product).

In this case, the gain-half gain angle product based on the diffusion material can be enlarged more by selecting the magnitude of the light diffusing half gain angle of the vertical lenticular lens so as to become greater than that of any other element, for example, the value of the vertically diffusing half gain angle based on the diffusion material as will be described later.

Further, moiré disturbance which arises as a side effect at that time can be eliminated by selecting the pitch of the Fresnel lens by means of a method to be described in detail below.

The typical dimensional values of the respective constituents shown in FIG. 5 are listed below as to the case of a 40-inch screen:

Vertical Lenticular Lens 8
- Diffusing half gain angle: ±5°
- Pitch $T_V$: 0.08 mm
- Radius of Curvature: 0.23 mm Fresnel Lens 20
- Pitch $T_F$: 0.14 mm Horizontal Lenticular Lens 19
- Diffusing half gain angle: ±40°
- Pitch $T_L$: 1.2 mm
- Radius of Curvature at Middle part: 0.5 mm
- Shape: Ellipsoid having an eccentricity of 0.67 and a major diameter of 0.9 mm Horizontally Diffusing Microscopic Lenticular Lens 9
- Diffusing half gain angle: ±4°
- Pitch $T_f$: 0.03 mm
- Radius of Curvature: 0.10 mm Examples of Overall Characteristics
- Gain: 7.0
- Horizontal half gain angle: ±40°
- Vertical half gain angle: ±7°
- Gain-Half gain angle Product: 1960

The analysis of moiré disturbance will now be described. First, it shall be indicated that the shape of the moiré disturbance is expressed by an ellipse family and a hyperbola family on plane coordinates. Next, the process of generation of the moiré disturbance and the modulation index of moiré shall be quantified by spectral analyses on spatial frequency coordinates, whereupon conditions for confining the moiré disturbance within allowable limits shall be clarified.

Figure 6:
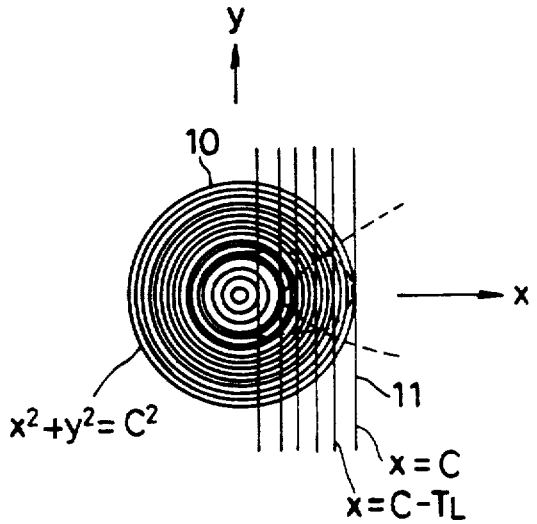
FIG. 6 is an explanatory diagram showing the pattern of moiré disturbance.

FIG. 6 is an explanatory diagram for finding the shape of moiré disturbance, in which numeral 10 indicates the paths of the concentrical Fresnel lens 20 and numeral 11 the paths of the vertical-striped main horizontal lenticular lens 19 (the lens 19 in FIG. 5).

In order to find what pattern is formed when individual intersection points are connected, x-y coordinates whose origin is the center of the Fresnel lens are adopted.

Paths 11 of Horizontal Lenticular Lens 19:

$$x = c - kT_L \quad \{k = 0, 1, 2, 3, \ldots\} \tag{6}$$

where c denotes a constant, and $T_L$ the pitch of the horizontal lenticular lens 19.

Paths 10 of Fresnel Lens 20:

$$x^2 + y^2 = (c - hT_F)^2 \quad \{k = 0, 1, 2, 3, \ldots\} \tag{7}$$

where c denotes a constant, and $T_F$ the pitch of the Fresnel lens 20.

In FIG. 6, the rightmost vertical line and the outermost circle are assumed to correspond to k=0 and h=0 in Eqs. 6 and 7 respectively. These intersect at x=c and y=0. The point of the intersection is expressed by a black dot in FIG. 6. This black dot seems to connect with adjacent black dots inside it, namely, the points of intersection between the straight line of k=1 and the circule of h=2, so that a moiré pattern is formed.

Accordingly, an equation which the intersection point family of one moiré pattern satisfies is obtained by eliminating k from the following expressions:

$$\left.\begin{aligned} x &= c - kT_L \\ x^2 + y^2 &= \left(c - k\left[\frac{T_L}{T_F}\right]T_F\right)^2 \end{aligned}\right\} \tag{8}$$

where [ ] is Gaussian symbol, which signifies the greatest integer not exceeding a value within [ ].

Though the process is omitted, the following equation results:

$$\frac{(x - x_o)^2}{a^2} + \frac{y^2}{a^2(1 - e^2)} = 1 \text{ where} \tag{9}$$

$$a = \frac{c}{1 + e}$$

$$e = \left[\frac{T_L}{T_F}\right]\frac{T_F}{T_L}$$

$$x_o = ae$$

As understood from Eq. 9, the moiré pattern is the ellipse family whose focus is the origin and which flattens more with its eccentricity coming nearer to 1 as the $T_L/T_F$ ratio is larger.

Another moireé pattern is included in FIG. 6. It is given by the intersection point family of the following expressions:

$$\left.\begin{aligned} x &= c + kT_L \\ x^2 + y^2 &= \left(c + k\left[\frac{T_L}{T_F} + 1\right]T_F\right)^2 \end{aligned}\right\} \tag{10}$$

$$k = 0, 1, 2, 3, \ldots$$

By eliminating k from the above expressions, the following equation is obtained:

$$\frac{(x - x_o)^2}{a^2} - \frac{y^2}{a^2(e^2 - 1)} = 1 \text{ where} \tag{11}$$

$$a = \frac{c}{1 + e}$$

$$e = \left[\frac{T_L}{T_F} + 1\right]\frac{T_F}{T_L}$$

$$x_o = ae$$

Thus, it is understood that the other moiré pattern is a hyperbola family whose focus is the origin.

The spatial frequencies $\Delta f_1$ (ellipse) and $\Delta f_2$ (hyperbola) of moiré along the x-axis in the middle of FIG. 6 are given by the following expressions:

$$\Delta f_1 = \frac{1}{T_F} - \left[\frac{T_L}{T_F}\right]\frac{1}{T_L}, \quad \Delta f_2 = \frac{1}{T_L} - \Delta f_1 \tag{12}$$

Figure 7:
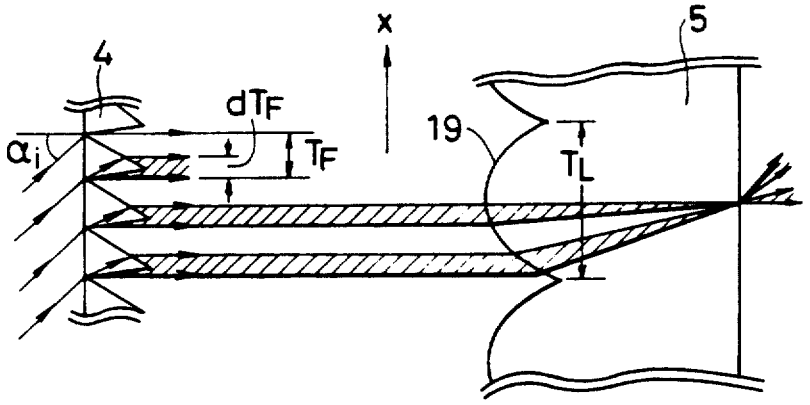
FIG. 7 is a horizontal sectional view showing the principle of appearance of the moiré disturbance.

The moiré patterns have thus far been explained, and quantitative analyses based on spectra will now be conducted. First, the principle of the generation of moiré will be clarified with reference to FIG. 7. In the figure, numerals 4 and 5 indicate the respective horizontal sections of the Fresnel sheet and the front sheet.

When incident light from the projection lens enters the Fresnel sheet at an angle $\alpha_i$, light-absence bands appear in the exit light thereof cyclically as indicated by hatched lines in the figure.

Letting d denote the duty factor of the light-absence band, the intensity distribution $T_F(x)$ of the exit light is expressed by the following equation:

$$T_F(x) = \Sigma \frac{\sin\{(1 - d)\, T_F\pi f\}}{(1 - d)\, T_F\pi f}\, e^{j2\pi f} \tag{13}$$

where f denotes the spatial frequency, and Σ is carried out for f=0, $\pm 1/T_F$, $\pm 2/T_F$. When the Fourier transform of the above equation is denoted by $F_F(f)$, it is expressed by the following equation:

$$F_F(f) = \Sigma \frac{\sin\{(1 - d)\, T_F\pi f\}}{(1 - d)\, T_F\pi f}\, \delta(f - nf_F) \tag{14}$$

where Σ is carried out for n=0, ±1, ±2, . . . , and $f_F = 1/T_F$

δ(f): Dirac delta function.

In the above equation, the value of d is usually within 0.4.

Figure 8:
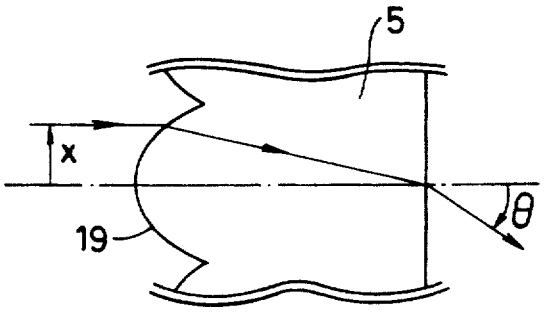
FIG. 8 is a horizontal sectional view of a front sheet.

The Fresnel exit light enters the front sheet 5. Here, under the action of the horizontal lenticular lens 19, the coordinate x of the incident position is converted into the directional angle $\theta$ of the exit light as illustrated in FIG. 8. The shape of the function $\theta(x)$ is determined by the profile of the lenticular lens.

By way of example, when the profile is in the form of an ellipse which is expressed by the following with a laterial axis in FIG. 8 taken as the y-axis:

$$\frac{y^2}{a^2} + \frac{x^2}{a^2(1 - n^{-2})} = 1$$

where n denotes the refractive index of the front sheet and is about 1.5, the function is given for the principal values of x, namely, for x of $|x| \leqq T_L/2$ by the following:

$$\sin\theta = \frac{n\frac{x}{a}}{1 + \frac{1}{n}\sqrt{1 - \left(\frac{x}{a}\right)^2 (1 - n^{-2})^{-1}}} \quad 16$$

where a denotes the major diameter of the ellipse, and $a \approx 0.9$ mm.

Supposing an ordinary viewing condition in which the screen is viewed in an arbitrary fixed direction $\theta$, the function of the lenticular lens 19 can be regarded as a sampler for sampling the principal values of x.

By differentiating Eq. 16 in the vicinity of x=0, the coefficient of conversion between the angle and the distance can be evaluated:

$$\frac{d\theta}{dx} = \frac{n}{a\left(1 + \frac{1}{n}\right)} \left(= \frac{1.5 \text{ rad}}{1.5 \text{ mm}} = \frac{5.7°}{0.1 \text{ mm}}\right) \quad 17$$

Figure 9:
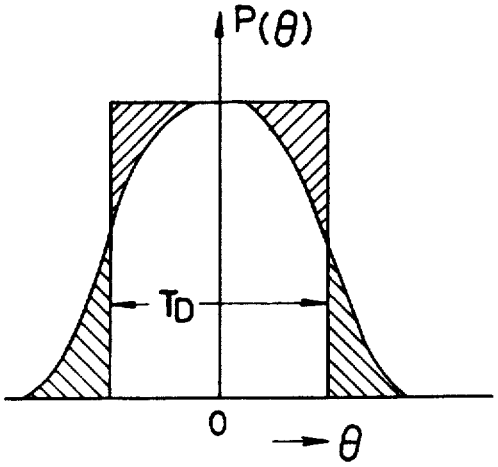
FIG. 9 is a characteristic diagram showing the directivity of a diffusion element.

While the diffusion element in the front sheet has been excluded in the above description, it will now be taken into consideration. As illustrated in FIG. 9, the diffusion element has the function of blurring the direction $\theta$ of the exit light. In the figure, the axes of ordinates $P(\theta)$ represents the intensity distribution of the diffusion angle changes $\theta$ based on the diffusion element. This distribution $P(\theta)$ can be transformed into a distribution function $T_D(x)$ concerning the principal values by virtue of the function $\theta(x)$ defined by Eq. 16:

$$T_D(x) = P\{\theta(x)\} \quad 18$$

A Fourier transform corresponding to $T_D(x)$ is expressed as $F_D(f)$. In this way, the angle blurring effect of the diffusion element can be equivalently considered in terms of the x-coordinate of incidence on the horizontal lenticular lens 19. As a result, the sampling distribution function $T_L(x)$ and spectrum $F_L(f)$ of the lenticular lens are respectively given by the following equations with the diffusion element included:

$$T_L(x) = \Sigma T_D(x - nT_L)T_L \quad 19$$
$$n = 0, \pm 1, \pm 2, \ldots$$

-continued $$F_L(f) = \Sigma F_D(f)\delta(f - nf_L) \quad 20$$
$$n = 0, \pm 1, \pm 2, \ldots$$

When the above is taken into consideration, Eq. 13 and Eq. 19 are multiplied as the functions of the x-coordinate, and the product enters the viewer's eye. Therefore, the distribution $T_A(x)$ and spectrum $F_A(f)$ of the overall output are evaluated by the following equations:

$$T_A(x) = T_F(x) \cdot T_L(x) \quad 21$$

$$F_A(f) = \int_{-\infty}^{+\infty} F_F(g)F_L(f - g)dg \quad 22$$

where g: parameter of the spatial frequency f. From Eqs. 14 and 20, $$F_A(f) = \Sigma \cdot S\{(1 - d)T_F\pi nf_F\}F_D(f - nf_F)\Sigma\delta(f - nf_F - mf_L) \quad 23$$
$$n = 0, \pm 1, \pm 2, \ldots$$
$$m = 0, \pm 1, \pm 2, \ldots$$

where $$S(f) = \sin f/f \quad 24$$

Eq. 23 is subjected to an inverse Fourier transform with note taken of the facts that S(0)=1 and $F_D(0)=1$ hold and that S(f) and $F_D(f)$ are even functions, whereby the following equation is obtained:

$$T_A(x) = \Sigma F_D(mf_L)e^{j2\pi mfLx} + 2S\{(1 - \alpha)\pi\}\Sigma F_D(mf_L)e^{j2\pi mfLx}\cos 2\pi f_F x + 2S\{2(1 - \alpha)\pi\}F_D(mf_L)\Sigma e^{j2\pi mfLx}\cos 4\pi f_F x + \ldots \quad 25$$

Where, Σ is added for m=0, ±1, ±2, . . . .

Assuming here that the shape of the distribution function $T_D(x)$ of the diffusion element be a Gaussian distribution the effective width of which is equal to $T_D$, the following equation is obtained:

$$T_D(x) = \frac{1}{T_D} e^{-\pi(\frac{x}{T_D})^2} \quad 26$$

$$\therefore F_D(f) = e^{-\pi(T_D f)^2} \quad 27$$

$$\therefore \Sigma F_D(mf_L) = 1 + 2e^{-(T_D f_L)^2\pi}\cos 2\pi f_L x + 2e^{-(2T_D f_L)^2\pi}\cos 4\pi f_L x + \ldots \quad 28$$

The shape of $T_A(x)$ can be grasped from Eqs. 25 and 28.

Figure 10:
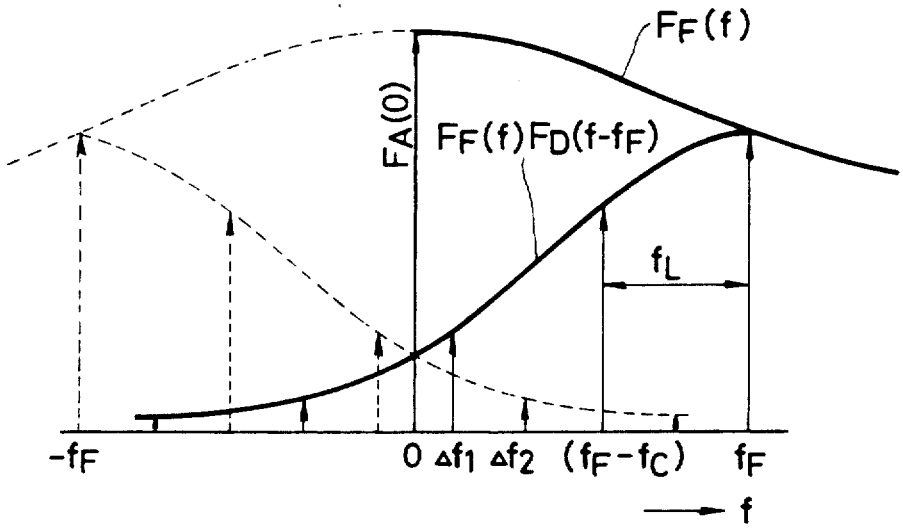
FIG. 10 is a characteristic diagram showing the arrangement of moiré spectra.

FIG. 10 illustrates principal spectra in $F_A(f)$.

In the figure, the axis of abscissas represents the spatial frequency f, and the axis of ordinates the amplitudes of the respective spectra.

The spectrum $F_A(0)=1$ at the origin expresses a direct current component. Principal moiré components are four spectra around the origin, and their spatial frequencies are $\pm\Delta f_1$ and $\pm\Delta f_2$. Since components of still higher frequencies become very fine patterns, they can be neglected in vision. Components of the third term et. seq. of Eq. 25 are associated with Fresnel's higher harmonics of the second and higher orders, but they are usually negligible because they are sufficiently small as compared with the principle moiré components. An example in the case where Fresnel's higher harmonic components of the second and higher orders are not negligible will be described later.

In general, $\Delta f_1$ and $\Delta f_2$ *are given by the following expressions:*

$$\left.\begin{aligned} \Delta f_1 &= f_F - \left[\frac{f_F}{f_L}\right] \times f_L \\ \Delta f_2 &= f_L - \Delta f_1 \end{aligned}\right\} \quad 29$$

where [ ] is the Gaussian symbol.

In a case where the $f_F/f_L$ ratio is just (an integer+0.5), $$\Delta f_1 = \Delta f_2 = f_L/2 \quad 30$$

holds.

When Eq. 30 holds, the spatial frequency of the moiré disturbance pattern becomes the maximum value of $f_L/2$, at which the moiré is the most inconspicuous in vision. In this case, when the D.C. component $F_A(O)$ and the principal moiré components are extracted from Eq. 25, the following equation is obtained:

$$T_A(x) \approx 1 + 2S(\pi - \pi d)\{F_D(k\, f_L) + F_D(k\, f_L + f_L)\} \cdot \cos \pi f_L x$$

where $k = [f_F/f_L]$

In Eq. 31, the coefficient of $\cos \pi f_L x$ denotes the modulation index of the moiré, M. When $(k\, f_L)$ and $(k\, f_F + f_L)$ within the parentheses of $F_D$ are approximated by $f_F$, the following approximate equation is obtained:

$$M \approx 4S(\pi - \pi d)F_D(f_F) \quad 32$$

Thus far, the moiré modulation index M which is the purpose of the analyses has been obtained.

Next, let's consider the allowable limit of the value M and a requirement to be met by $F_D(f_F)$.

The spatial frequency $f_L/2$ of the moiré disturbance is equal to the spatial frequency of the highest limit which can be reproduced by a discrete structure determined is by the pitch $T_L$ of the horizontal lenticular lens. It is known that the allowable limit of the disturbance in such a region is $M \leqq 0.1$.

On the other hand, the term $S(\pi - \pi d)$ in Eq. 32 expresses the amplitude of the fundamental wave component in the Fresnel exit light as understood from Eqs. 14 and 24 already mentioned. d expresses the duty factor of the light-absence band, the value of which is usually within 0.4 as stated before. Accordingly, the value of $S(\pi - \pi d)$ is within approximately 0.5.

For the above reason, in order to confine the moiré disturbance within the allowable limit, the following required in view of Eq. 32:

$$0.1 \geqq 4 \times 0.5 \times F_D(f_F)$$

$$\therefore F_D(f_F) \leqq 0.05$$

When this is applied to the case of the Gaussian distribution of Eq. 27:

$$F_D(f_F) = e^{-\pi(T_D f_F)^2} \leqq 0.05$$

-continued $$\therefore T_D \geqq 1/f_F = T_F \quad (33)$$

where $T_D$ denotes the effective width of the Gaussian distribution, which is given by $\sqrt{2\pi}$ times the standard deviation thereof.

That is, the effective diffusion with $T_D$ of the diffusion element may be set at or above the Fresnel period $T_F$. In practice, even when $T_F$ is set at about 150% of $T_D$, there is no inconvenience to ordinary uses.

While, in the foregoing description, the diffusion element has been assumed to conform to the Gaussian distribution characteristic, the invention is also applicable to cases of other distributions as it is. For the general distribution $T_D(x)$, the effective diffusion width $T_D$ thereof is defined by the following equation:

$$T_D = \frac{\int_{-\infty}^{\infty} T_D(x)dx}{T_D(O)} \quad 34$$

The concept of this effective diffusion width is as illustrated in FIG. 9.

FIG. 9 is the characteristic diagram showing the relationship between $\theta$ and $P(\theta)$. Here, the areas of parts of rightward-descending oblique lines and parts of leftward-descending oblique lines are equal.

Figure 11:
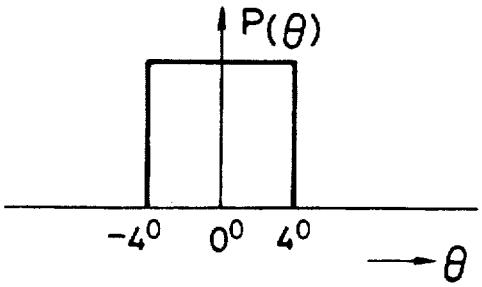
FIG. 11 is a characteristic diagram showing the directivity of a microscopic lenticular lens.

In the fundamental embodiment of the present invention shown in FIG. 5, the microscopic lenticular lens 9 is adopted as the diffusion element. The diffusion characteristic thereof is as illustrated in FIG. 11 (a characteristic diagram). Accordingly, the effective width is 8 degrees in terms of an angular region. When it is altered into an input side x-coordinate by Eq. 17, $T_D$ is calculated as approximately 0.14 mm.

In view of Eq. 33, accordingly, setting the Fresnel pitch $T_F$ at or below 0.14 mm is required for suppressing the moiré disturbance within the allowable limit.

Meanwhile, as the frequency condition of the moiré, it is desirable to satisfy a condition to be mentioned below. When the condition is not met, the moiré disturbance roughens and suddenly becomes conspicuous.

$$\Delta f_1, \Delta f_2 \leqq 0.5 \times (f_L/2) \quad 35$$

When this is substituted into Eq. 29, the following equation is obtained:

$$f_F/f_L = \text{integer} + 0.25 \text{ to } 0.75 \quad 35$$

When the value of the integer is made smaller in the above equation, the pitch $(T_L = 1/f_L)$ of the Fresnel lens can be enlarged to facilitate the fabrication to that extent, whereas a difficulty for making the diffusion angle of the microscopic lenticular lens excessively wide is involved. In conclusion, the integral value recommended in practical use is 3 to 10 inclusive.

In the above description, it has been assumed that the directivity $P(\theta)$ of the diffusion element in FIG. 9 have a gentle shape, so $F_D(2\, f_F)$ be sufficiently smaller in magnitude than $F_D(f_F)$ and be negligible in Eqs. 23 et seq.

This property, however, does not always hold in the case of the rectangular wave directivity shown in FIG. 11. In this case, the influence of the higher harmonic components of the Fourier spectra of the directivity need also to be considered. That is, also the terms of $n = \pm 2$ need to be taken into account in Eq. 23. Accordingly, besides $\Delta f_1$ and $\Delta f_2$ in Eq. 29, also the following $\Delta f_3$ and $\Delta f_4$ need to be considered:

$$\left.\begin{aligned} \Delta f_3 &= 2f_F - \left[\frac{2f_F}{f_L}\right] \times f_L \\ \Delta f_4 &= f_L - \Delta f_3 \end{aligned}\right\} \qquad 29'$$

where [ ] is the Gaussian symbol.

The values of $\Delta f_1$, $\Delta f_2$, $\Delta f_3$ and $\Delta f_4$ are determined from $f_F$ and $f_L$ by Eqs. 29 and 29'. In order to render the moiré disturbance inconspicuous, the smallest value among $\Delta f_1$, $\Delta f_2$, $\Delta f_3$ and $\Delta f_4$ need to be maximized, and a condition therefor is to set $f_F/f_L$ at a multiple of 3. At that time, $\Delta f_1$, . . . can be proved equal to $\Delta f_L/3$ or $(2^{\Delta}\int L)/3$. In other words, the moiré pattern appears at a period 3 times that of the lenticular pattern.

In practice, it is effective to set the $f_F/f_L$ ratio so as to fulfill the conditions of the following equation instead of Eq. 35:

$$2\ f_F/f_L = \text{integer} + 0.25 \text{ to } 0.75 \qquad 35'$$

Thus far, the condition of the Fresnel pitch for suppressing the moiré disturbance within the allowable limit has been described. The condition indicated by this analysis is basically different in idea from $f_F/f_L = 1.35$ to 1.43 asserted in the prior art.

Figure 12:
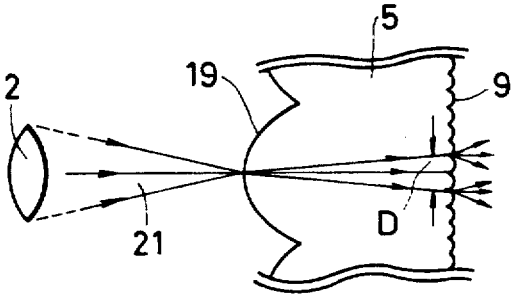
FIG. 12 is a horizontal sectional view of the front sheet.

Next, the condition of selecting the pitch $T_l$ of the microscopic lenticular lens 9 in the fundamental embodiment of FIG. 5 will be described with reference to FIG. 12 (a plan view). Numeral 2 designates the projection lens, and numeral 5 the front sheet. The Fresnel sheet is omitted for the brevity of the description. In the figure, D denotes the diameter of the image of the exit pupil 21 of the projection lens 2 formed on the microscopic lenticular lens 9 by the principal horizontal lenticular lens 19.

An angle at which the projection is viewed from the screen is approximately 3°. This angle turns approximately 2° within the front sheet in conformity with Snell's law. Since the thickness of the front sheet is approximately 1.5 mm, the value of the image diameter D becomes about 50 μm.

$T_l$ needs to fulfill the following equation:

$$T_l \leqq D \qquad 36$$

The reason is that, when $T_l$ is greater than D, the indicent light fails to be given an expected diffusion angle.

The image diameter D, accordingly $T_l$, can be enlarged in such a way that a granular diffusion material such as $SiO_2$ is mixed in the front sheet in a slight amount to the extent of incurring no lowering of the gain.

The fundamental embodiment of the present invention has thus far been described, and other embodiments will be now explained.

Figure 13:
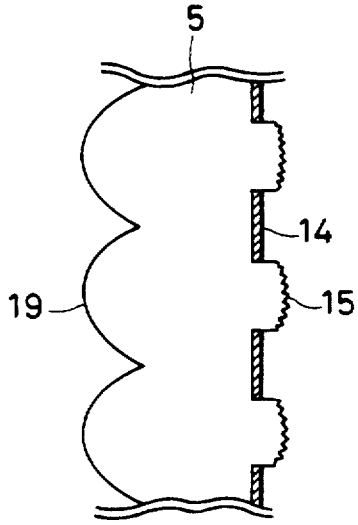
FIG. 13 is a horizontal sectional view of a front sheet showing a first modified embodiment.

FIG. 13 shows a first modified embodiment. It depicts a horizontal sectional view of the front sheet. In the figure, numeral 14 designates a black paint, which lowers the reflection factor for ambient light thereby to enhance to contrast of a picture. Numeral 15 indicates an output side lenticular lens subjected to the microscopic lenticular treatment according to the present invention. As illustrated, a plurality of partially cylindrical lenses are provided on the output side of the sheet 5 and formed with horizontally diffusing microscopic lenses. This lenticular element serves to reduce color shifts.

Figure 14:
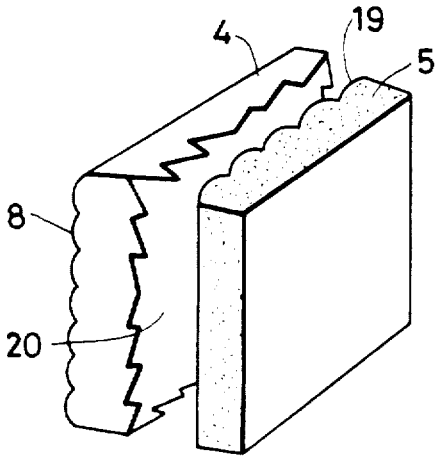
FIGS. 14, 15 and 16 are perspective views showing different embodiments of the present invention respectively.

A second modified embodiment of the present invention is shown in FIG. 14 (a perspective view). The point of difference between the figure and FIG. 5 is that, in FIG. 14, the microscopic lenticular lens is dispensed with, while the front sheet used is a front sheet in which a slight amount of light diffusing material (for example, 6–8 gr/m$^3$ of $SiO_2$) is mixed. In order to make the effect of the present invention significant in this example, the value of the diffusing half angle $\alpha_V$ of the vertical lenticular lens 8 needs to be set larger than the value of the diffusing half gain angle based on the slight amount of diffusion material contained in the front sheet. In this way, the improvement of the gain-half gain angle product by about 3 dB or more can be achieved over the prior art. In this case, the pitch $T_F$ of the Fresnel lens 20 needs to be fined to about 1/10 of the pitch of the lenticular lens 8.

Figure 15:
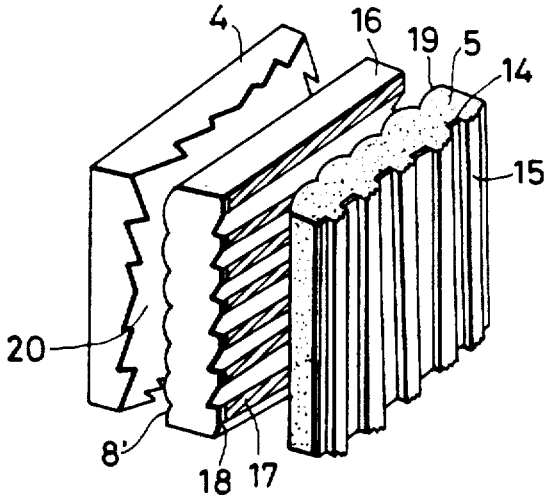

Shown in FIG. 15 (a perspective view) is a third modified embodiment. In the figure, numeral 4 indicates the Fresnel sheet, numeral 5 the front sheet, and numerals 14 and 15 the same constituents as illustrated in FIG. 13. Numeral 16 indicates a vertical lenticular sheet, numeral 8' a vertical lenticular lens, numeral 17 a black paint which prevents the degradation of contrast attributed to ambient light, and numeral 18 a prism which serves to prevent the degradation of contrast attributed to ambient light coming from above obliquely and also to refract projected light upwards. Regarding a projection type television receiver for domestic use, it is desired that the projection type TV receiver be set lower than the eye so as to look down for easy viewing. This modified embodiment is well suited for such usage.

Figure 16:
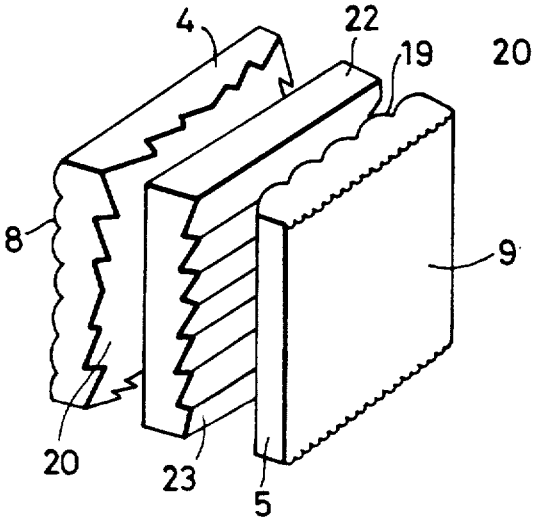

FIG. 16 is a perspective view showing the construction of another embodiment of the present invention. Numeral 4 designates the Fresnel sheet the input surface and output surface of which are respectively formed of the vertical lenticular lens 8 and the Fresnel lens 20. Numeral 5 designates the front sheet the input surface and output surface of which are respectively formed of the horizontal lenticular lens 19 and the horizontal lenticular lens of microscopic pitch 9. A third sheet 22, which is interposed between the sheets 4 and 5, has its output surface furnished with a prism 23 which is formed into horizontal stripes as shown in the figure. This prism has effects similar to those of the prism 18 explained in the embodiment shown in FIG. 15.

As understood from the above description, according to the present invention, the light utilization factor of a picture projection apparatus can be improved to about 1.4 times or more in the sense of a gain-half gain angle product. Accordingly, more beautiful pictures can be provided at lower power consumption and at lower cost, and the industrial value is very great.

What is claimed is:

1. A rear projection apparatus comprising an image source, a projection lens which projects an image produced from said image source, and a transmissive screen on which the image is focused via said lens;

said screen including at least a first sheet which is disposed on a side of said screen remote from said image source on an optical path extending from said image source to said screen, and a second sheet which is disposed on a side of said screen close to said image source;

said first sheet comprising a difficult element which reduces moiré disturbance, and a main horizontally-diffusing lenticular lens which is formed on an input surface of said first sheet;

an exit surface of said second sheet being provided with a Fresnel lens whose pitch is set to be at most 150% of an effective diffusion width of said diffusion element;

an input side of said second sheet being provided with a vertical lenticular lens which diffuses light vertically.

2. A rear projection apparatus according to claim 1, wherein said diffusion element is made of a horizontally-diffusing microscopic lenticular lens which is formed on an exit side of said first sheet and whose pitch is set to be smaller than a width of an image of an exit pupil of said projection lens formed on said horizontally-diffusing microscopic lenticular lens by said main horizontally-diffusing lenticular lens.

3. A rear projection apparatus according to claim 1 wherein a spatial frequency $f_F$ based on arrayal of said Fresnel lens is set at (N+0.25 to 0.75) times a spatial frequency $f_L$ based on arrayal of said main horizontally-diffusing lenticular lens, and the value N is an integer of at least 3.

4. A rear projection apparatus according to claim 1, wherein said diffusion element includes a plurality of parallel horizontally-diffusing microscopic lenticular lenses which are formed on an exit side of said first sheet, and members of a light absorbing material are interposed between the respectively adjacent horizontally-diffusing microscopic lenticular lenses.

5. A rear projection apparatus according to claim 1, wherein said first sheet is made of a front sheet in which a slight amount of light diffusing material is mixed, and a value of diffusion half gain angle $\alpha_V$ of said vertical lenticular lens is set to be larger than that of a diffusion half gain angle based on said diffusing material.

6. A rear projection apparatus according to claim 1, further comprising a third sheet is interposed between said first sheet and said second sheet, and an exit surface of said third sheet is provided with a plurality of prism members formed as horizontal stripes.

7. A rear projection apparatus according to claim 2, wherein a spatial frequeny $f_F$ based on arrayal of said Fresnel lens is set at (N+0.25 to 0.75) times a spatial frequency $f_L$ based on arrayal of said main horizontally-diffusing lenticular lens, and the value N is an integer of at least 3.

8. A rear projection apparatus according to claim 1, wherein said diffusion element includes a plurality of parallel partially cylindrical lenses respectively formed with horizontally-diffusing microscopic lenticular lenses on an exit side of said first sheet, and a member of a light absorbing material being interposed between adjacent ones of said parallel partially cylindrical lenses.

9. A rear projection apparatus according to claim 1, wherein said Fresnel lens is a circular Fresnel lens.

10. A rear projection apparatus comprising an image source, a projection lens which projects an image produced from said image source, and a transmissive screen on which the image is focused via said lens;

said screen including at least a first sheet which is disposed on a side of said screen remote from said image source on an optical path extending from said image source to said screen, a second sheet which is disposed on a side of said screen close to said image source, and a third sheet interposed between said first sheet and said second sheet;

said first sheet comprising a diffusion element which reduces moiré disturbance, and a main horizontally-diffusing lenticular lens which is formed on an input surface of said first sheet;

an exit surface of said second sheet being provided with a Fresnel lens whose pitch is set to be at most 150% of an effective diffusion width of said diffusion element; *and* an input [side of said second sheet] *surface of at least one of said second sheet and said third sheet* being provided with a [vertical] *vertically diffusing* lenticular lens which diffuses light vertically[;

at least one surface of said third sheet being provided with a vertical lenticular lens which diffuses light vertically].

11. A rear projection apparatus according to claim 10, wherein said [vertical] *vertically diffusing* lenticular lens is provided on an input surface of said third sheet, and an exit surface of said third sheet is composed of prism member parts formed as horizontal stripes and light absorbing material parts, said prism member parts and said light absorbing material parts being arranged alternately.

12. A rear projection apparatus according to claim 10, wherein said diffusion element is made of a horizontally-diffusing microscopic lenticular lens which is formed on an exit side of said first sheet and whose pitch is set to be smaller than a width of an image of an exit pupil of said projection lens formed on said horizontally-diffusing microscopic lenticular lens by said main horizontally-diffusing lenticular lens.

13. A rear projection apparatus according to claim 10, wherein a spatial frequency $f_F$ based on arrayal of said Fresnel lens is set at (N+0.25 to 0.75) times a spatial frequency $f_L$ based on arrayal of said main horizontally-diffusing lenticular lens, and the value N is an integer of at least 3.

14. A rear projection apparatus according to claim 10, wherein said diffusion element includes a plurality of parallel horizontally-diffusing microscopic lenticular lenses which are formed on an exit side of said first sheet, and members of a light absorbing material are interposed between the respectively adjacent horizontally-diffusing microscopic lenticular lenses.

15. A rear projection apparatus according to claim 10, wherein said first sheet is made of a front sheet in which a slight amount of light diffusing material is mixed, and a value of a diffusion half gain angle $\alpha_V$ of said vertical lenticular lens is set to be larger than that of a diffusion half gain angle based on said diffusing material.

16. A rear projection apparatus according to claim 12, wherein a spatial frequency $f_F$ based on arrayal of said Fresnel lens is set at (N+0.25 to 0.75) times a spatial frequency $f_L$ based on arrayal of said main horizontally-diffusing lenticular lens, and the value N is an integer of at least 3.

17. A rear projection apparatus according to claim 10 wherein said Fresnel lens is a circular Fresnel lens.

18. A rear projection apparatus according to claim 10, wherein said diffusion element is made of a horizontally-diffusing microscopic lenticular lens which is formed on an exit side of said first sheet.

*19. A rear projection apparatus comprising an image source, a projection lens which projects an image produced*

*from said image source, and a transmissive screen on which the image is focused via said lens;*

*said screen including at least a first sheet which is disposed on a side of said screen remote from said image source on an optical path extending from said image source to said screen, and a second sheet which is disposed on a side of said screen close to said image source;*

*said first sheet comprising a diffusion element which reduces moire disturbance, and a main lenticular lens which diffuses light in one direction and which is formed on an input surface of said first sheet;*

*an exit surface of said second sheet being provided with a Fresnel lens whose pitch is set to be at most 150% of an effective diffusion width of said diffusion element; and*

*said diffusion element being made of a microscopic lenticular lens which diffuses light in said one direction and is formed on an exit side of said first sheet and whose pitch is set to be smaller than a width of an image of an exit pupil of said projection lens formed on said microscopic lenticular lens by said main lenticular lens.*

*20. A rear projection apparatus according to claim 19, wherein a spatial frequency $f_F$ based on arrayal of said Fresnel lens is set at ($N+0.25$ to $0.75$) times a spatial frequency $f_L$ based on arrayal of said main lenticular lens, the value $N$ being an integer of at least 3.*

* * * * *